Dec. 8, 1959  R. L. FRANK  2,916,629
AUTOMATIC DIRECTION OF SCAN CONTROL SYSTEM FOR PHOTOSCANNERS
Filed Sept. 30, 1955
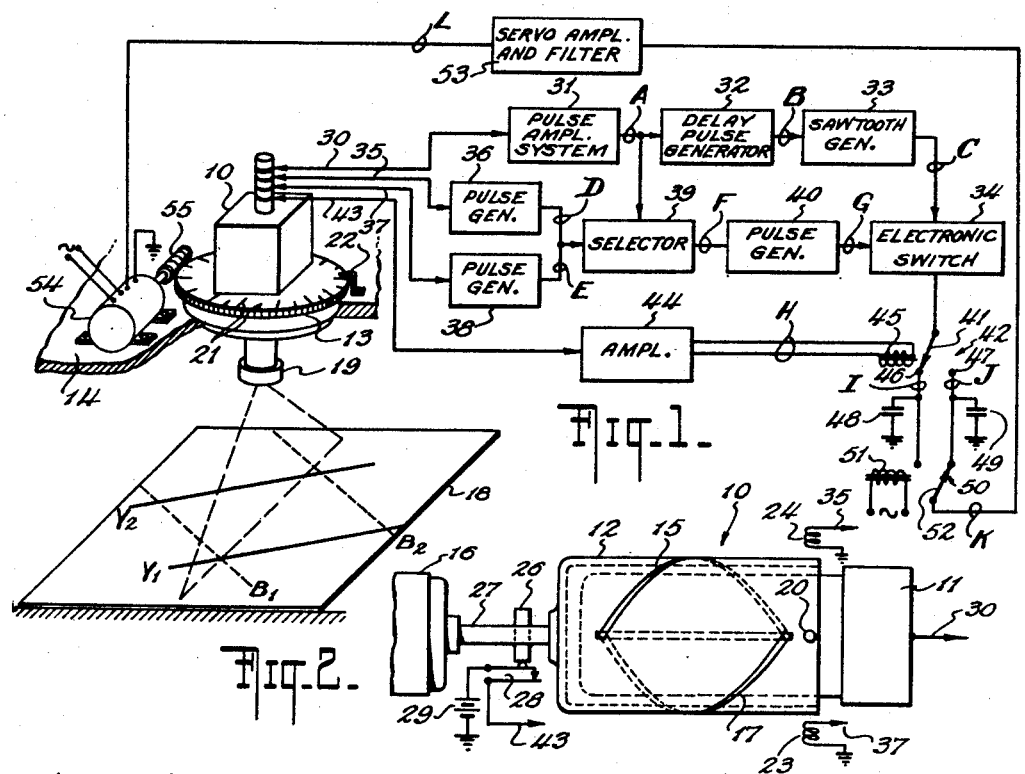
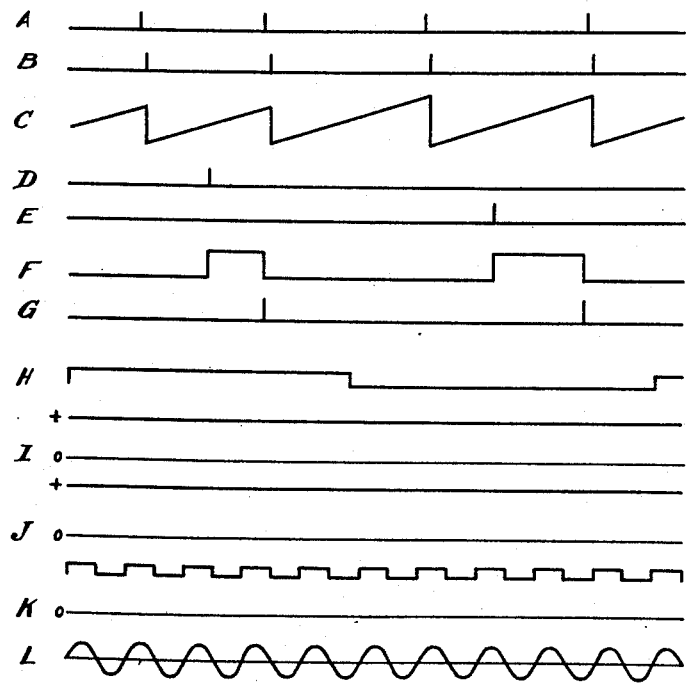
INVENTOR
ROBERT L. FRANK
BY
ATTORNEY United States Patent Office 2,916,629
Patented Dec. 8, 1959

2,916,629
AUTOMATIC DIRECTION OF SCAN CONTROL SYSTEM FOR PHOTOSCANNERS

Robert L. Frank, Great Neck, N.Y., assignor to Sperry Rand Corporation, a corporation of Delaware Application September 30, 1955, Serial No. 537,629

14 Claims. (Cl. 250—201)

This invention relates to scanning apparatus, and in particular to apparatus for automatically controlling the direction of scan of a photoscanner from information derived while scanning lines on a chart.

In application Serial No. 577,401, filed April 10, 1956, in the name of Wilbert P. Frantz, entitled "Positional Control System for Photoscanners," which is a continuation-in-part of application Serial No. 534,731, filed September 15, 1955, now abandoned, and assigned to the same assignee as the present invention, there is described and claimed a positional control system for automatically moving a photoscanner with respect to navigational lines on a chart in accordance with supplied navigational data. The photoscanner is moved relative to the chart by comparing both the position of the scanner and the position represented by the supplied navigational data relative to the navigational lines being scanned. The photoscanner transversely scans the navigational lines to produce recurrent output pulses whose time between pulses varies according to the distance between the lines as measured along the line of scan. A first direct voltage whose magnitude varies according to the distance between the lines is produced from the recurrent pulses. From this first direct voltage there is produced a second voltage whose magnitude is controlled by the supplied navigational data and represents the distance between one of the navigational reference lines and the position on the chart between the lines to which the photoscanner is to be moved. A third direct voltage is produced by the positional control system whose magnitude represents the distance between the center of scan of the photoscanner and the navigational reference line. A positional control voltage derived by taking the difference between the second and third voltages is supplied to a servomotor coupled to the photoscanner for moving the scanner along its direction of scan until the center of scan corresponds to the position on the chart represented by the supplied navigational data.

The positional control system of the aforesaid application Serial No. 577,401 transversely scans first and second lines of position such as those derived from a pair of loran transmitting stations, and locates the position of the scanner along its direction of scan between the navigational lines of position. In order to position the photoscanner with respect to a predetermined fixed point on the chart, it is necessary to transversely scan first and second pairs of lines of position. The present invention is concerned with apparatus for automatically controlling the direction of scan of a scanner to transversely scan first and second pairs of lines on a chart.

Accordingly, the principal object of the present invention is to provide for the automatic control of the direction of scan of a scanner to insure that first and second pairs of lines on a chart are transversely scanned.

Another object of the invention is to control the direction of scan of a scanner to scan in a direction parallel to the diagonal of the intersection of first and second pairs of lines on a chart.

Still another object of the invention is to produce an output control voltage whose magnitude is proportional to the difference in distance between a first pair of lines and a second pair of lines being transversely scanned by a scanner.

Yet another object of the invention is to provide scanning apparatus for automatically indicating the direction of the diagonal between intersecting first and second pairs of lines on a chart being scanned with respect to the chart.

In accordance with the present invention there is introduced scanning apparatus including a photoscanner for transversely scanning first and second pairs of lines on a chart. A first voltage is produced by said scanning apparatus whose magnitude varies according to the distance between the first pair of lines being scanned as measured along the line of scan, and a second voltage is produced whose magnitude varies according to the distance between the second pair of lines being scanned as measured along the same line of scan. A comparator means responsive to the first and second voltages produces an output control voltage whose magnitude varies according to the difference between the first and second voltages. This control voltage is supplied to a servomotor coupled to the photoscanner to automatically rotate the photoscanner about an axis perpendicular to its direction of scan until the distance between the first pair of lines and the second pair of lines as measured along the line of scan is substantially equal.

The above objects of and the brief introduction to the present invention will be more fully understood and further objects and advantages will become apparent from a study of the following detailed description in connection with the drawings, wherein, Fig. 1 is a block diagram of the automatic direction of scan control system of the present invention.

Fig. 2 is a view of the photoscanner showing the rotating drum with line separating color filters and the cam operated switch producing the color separation signal.

Fig. 3 is a partial cross-sectional view of the cylindrical drum showing one of the color filters covering the helical slit in the wall of the drum.

Fig. 4 illustrates waveforms of voltages associated with the block diagram of Fig. 1.

Referring to Fig. 1, a photoscanner 10 is mounted on a circular rotatable base 13 seated within a circular bearing surface in platform 14. The photoscanner is situated above a chart 18 and transversely scans a first pair of yellow lines Y1 and Y2 and a second pair of blue lines B1 and B2 sequentially. The direction of scan of the photoscanner is controlled by orienting its angular position about a vertical axis passing through the center of the photoscanner. The rotatable circular base 13 is provided with angular graduations 21 in the form of a compass rose for indicating the angular position of the photoscanner about the vertical axis. A pointer 22 attached to the platform 14 serves as a reference index point.

The photoscanner 10 includes a phototube 11 whose photocathode is covered with a mask having a long narrow aperture extending parallel to the longitudinal axis of the phototube as illustrated in Fig. 2. The phototube with mask is inserted within the hollow cylindrical drum 12 which has a first one-half turn helical slit 15 and a second one-half turn helical slit 17 through the wall thereof. Light to be admitted to the photocathode of phototube 11 passes through the opening defined by the intersection of one of the narrow helical slits 15 or 17 and the elongated narrow opening in the mask which covers the photocathode. The cylindrical drum 12 is rotated at a constant angular velocity by a motor 16 to provide scanning along a straight line extending parallel to the longitudinal axis of the cylindrical drum. Two complete scanning cycles are produced for each revolution of the drum. The image of the first and second pairs of lines is focussed upon the photocathode of phototube 11 by a lens 19 as illustrated in Fig. 1. Photoscanner 10 is similar to the scanner shown and described in application Serial No. 473,249, filed December 6, 1954, in the name of Roger B. Williams, Jr., entitled "Amplitude Equalizing System," and assigned to the same assignee as the present invention. This photoscanner is also similar to the scanner employed in the aforesaid application Serial No. 577,401, in the name of Wilbert P. Frantz, entitled "Positional Control System for Photoscanners."

Scanning drum 12 in Fig. 2 is provided with a magnetic tab 20 attached to its outside wall. The magnetic tab is revolved past first and second pickup coils 23 and 24. Each time tab 20 moves past pickup coil 23 a center of scan pulse is produced in the coil corresponding to the center of scan of helical slit 15. Each time tab 20 moves past pickup coil 24 a center of scan pulse is produced in coil 24 corresponding to the center of scan of helical slit 17.

Each of the helical slits 15 and 17 are covered with filters for separating the response of the phototube 11 to the yellow lines Y1 and Y2 and the blue lines B1 and B2 on chart 18. The filter 25 for helical slit 15 is situated within a groove in the outside wall of drum 12 covering the slit 15 as shown in Fig. 3. The color filter 25 is selected to allow the photoscanner to respond to the blue lines B1 and B2 on chart 18 without responding to the yellow lines. Similarly, another color filter covering the helical slit 17 is selected to allow the photoscanner to respond to the yellow lines Y1 and Y2 on chart 18 without responding to the blue line.

Photoscanner 10 is provided with a cam 26 attached to shaft 27 for closing a single-pole single-throw switch 28 throughout each alternate half revolution of shaft 27 to produce a color separating square-wave voltage. The switch 28 is closed during the half revolution of the photoscanner that the yellow lines Y1 and Y2 are being scanned through helical slit 17. The switch 28 closes the circuit through battery 29 to produce the color separating voltage on lead 43. During the other half revolution of shaft 27, the switch 28 and the circuit through battery 29 is open.

Photoscanner 10 in scanning the first pair of lines Y1—Y2 and the second pair of lines B1—B2 each revolution of the scanner produces recurrent output pulses on lead 30. These output pulses are coupled to pulse amplifier system 31 in Fig. 1 to produce recurrent output pulses of waveform A as illustrated in Fig. 4. The output pulses of waveform A are coupled to a delay pulse generator 32 to produce the delayed output pulses of waveform B. These pulses are delayed only slightly from the pulses of waveform A. The delayed pulses of waveform B are applied to a sawtooth generator 33 for producing a linear sawtooth output voltage of waveform C. The sawtooth voltage is coupled to an electronic switch 34.

The recurrent center of scan pulses produced during the scanning of the lines Y1—Y2 are coupled over lead 35 to a pulse generator 36. The center of scan pulses at the output of pulse generator 36 appear as waveform D as illustrated in Fig. 4. The recurrent center of scan pulses generated in pickup coil 23 during the scanning of the lines B1—B2 are coupled over lead 37 to a pulse generator 38. The center of scan pulses at the output of pulse generator 38 appear as waveform E. The center of scan pulses of waveforms D and E are applied to an Eccles-Jordan selector circuit 39. Each of these recurrent center of scan pulses activates or turns on the Eccles-Jordan selector circuit which is turned off by the first recurrent pulse of waveform A to occur following each activation of the selector. In other words, the selector 39 is activated to produce a rectangular output voltage whose leading edges coincide with the recurrent center of scan pulses D and E and whose trailing edges coincide with the first pulses of waveform A to occur following each activation of the selector. The rectangular output voltage from selector 39 appears as waveform F in Fig. 4 and is supplied to a pulse generator 40 to produce recurrent output pulses whose time of occurrence coincides with the trailing edges of the rectangular voltage. The recurrent output pulses from pulse generator 40 appear as waveform G in Fig. 4, and are supplied to activate the electronic switch 34.

The electronic switch 34 momentarily couples the sawtooth output voltage of waveform C to the armature or movable contact 41 of relay 42. The color separating signal from the cam activated switch 28 and battery 29 is coupled over lead 43 to amplifier 44. The color separating signal appears at the output of amplifier 44 as waveform H, and is applied to winding 45 of relay 42 to vibrate armature 41 between the first terminal 46 and a second terminal 47. During the scanning of the lines Y1—Y2 on chart 18 the armature or movable contact 41 is held in contact with the first fixed terminal 46. During these scanning intervals condenser 48 receives a charge through electronic switch 34 from the sawtooth generator 33. The condenser 48 is charged to the peak value of the sawtooth voltage of waveform C during the moments that switch 34 is activated by the switching pulses of waveform G. During the intervals that photoscanner 10 is scanning lines B1—B2, relay 42 is unenergized and armature 41 is held in contact with the second fixed terminal 47. During these scanning intervals condenser 49 is charged to the peak value of the sawtooth voltage of waveform C from sawtooth generator 33.

If the peak value of the sawtooth voltage of waveform C is larger during the scanning of the lines B1—B2 than during the scanning of lines Y1—Y2 the peak value of the direct voltage produced across condenser 49, illustrated as waveform J, is larger than the peak value of the direct voltage of waveform I produced across condenser 48. Since the magnitude of the voltage of waveform J across condenser 49 varies according to the peak value of the sawtooth voltage of waveform C during the scanning of the blue lines B1—B2, the magnitude of this voltage varies according to the distance between lines B1 and B2 as measured along the line of scan. Similarly, the magnitude of the voltage of waveform I across condenser 48 varies as the peak value of the sawtooth voltage of waveform C during the scanning of the yellow lines Y1—Y2, and the magnitude of this voltage varies according to the distance between the lines Y1 and Y2 as measured along the line of scan.

The voltage difference between the first direct voltage of waveform I and the second direct voltage of waveform J is obtained by means of a relay comparator 50 having a winding 51 energized by a sinusoidal alternating reference voltage. Armature 52 alternates between the first direct voltage of waveform I and the second direct voltage of waveform J to produce a square-wave output voltage of waveform K whose magnitude varies according to the difference between the direct voltages and whose phase is determined by the larger of the two direct voltages. This output voltage of waveform K is applied to a servo amplifier and filter 53 to produce a sinusoidal error control voltage of waveform L which is applied to a two-phase servomotor 54 mounted on platform 14. The alternating reference voltage applied to winding 51 of relay comparator 50 is also applied as the reference voltage to the servomotor 54. The phase shift through the relay comparator 50 and servo amplifier and filer 53 is adjusted so that the phase of the control voltage of waveform L is 90 degrees with respect to the sinusoidal reference voltage.

The error control voltage energizes the servomotor 54 to drive the angular position of scanner 10 through the worm gear 55 to orient the scanning direction of the photoscanner 10. The servomotor rotates scanner 10 until the magnitude of the first direct output voltage of waveform I and the second direct output voltage of waveform J are substantially equal resulting in zero output error control voltage. Under this condition the peak value of the sawtooth voltage of waveform C during the scanning of the yellow lines Y1—Y2 is substantially equal to the peak value of the sawtooth voltage during the scanning of the blue lines B1—B2. Thus, the distances between lines Y1 and Y2 and between B1 and B2 as measured along the line of scan are substantially equal. For this condition, photoscanner 10 has been oriented to scan along a direction substantially parallel to a diagonal defined by the intersection of the lines Y1—Y2 and B1—B2. The phase of the error control voltage of waveform L with respect to the reference alternating voltage supplied to the servomotor 54 is initially selected so that when the second direct output voltage of waveform J is larger than the first direct output voltage of waveform I the photoscanner 10 is driven by servomotor 54 to rotate in a clockwise direction about its vertical axis as viewed from above the photoscanner. For this condition, photoscanner 10 is oriented to scan along a line substantially parallel to the short diagonal of the intersecting pairs of lines Y1—Y2 and B1—B2 on chart 18.

When the photoscanner 10 has been properly oriented, the direction of a line defining the short diagonal may be read on calibrated dial 21 with the aid of pointer 22. This measurement establishes the direction of the short diagonal on chart 18 with respect to the coordinates of the chart itself.

The present invention is not limited to the use of a photoscanner for optically scanning first and second pairs of lines on the chart but may be adapted to any type of scanning device which produces a first output voltage representing a distance between a first pair of lines and a second output voltage representing a distance between a second pair of lines.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for automatically controlling the direction of scan of a photoscanner with respect to first and second pairs of lines on a chart, said first pair of lines intersecting said second pair of lines, said photoscanner transversely scanning said first and second pairs of lines and producing first recurrent output pulses corresponding to the first pair of lines being scanned and producing second recurrent output pulses corresponding to the second pair of lines being scanned, the time between said first recurrent output pulses varying according to the distance between said first pair of lines as measured along the line of scan, the time between said second recurrent output pulses varying according to the distance between said second pair of lines as measured along the line of scan, said photoscanner further producing third recurrent output pulses whose time position occurs at the center of scan of said photoscanner as said first pair of lines is being scanned and producing fourth recurrent output pulses whose time position occurs at the center of scan of said photoscanner as said second pair of lines is being scanned, comprising in combination, delay pulse generator means coupled to said photoscanner and responsive to said first and second recurrent output pulses, said delay pulse generator introducing a fixed time delay of said first and second recurrent pulses, said time delay being a very small percentage of the recurrence time interval of said first and second recurrent pulses, sawtooth generator means coupled to the output of said time delay pulse generator for producing a sawtooth output voltage, the peak value of said sawtooth voltage having a first value during the scanning of said first pair of lines and having a second value during the scanning of said second pair of lines, selector means coupled to said photoscanner and responsive to said first and second recurrent output pulses and to said third and fourth recurrent center of scan pulses, said selector means being activated by each of said third recurrent center of scan pulses to select the first pulse of said first recurrent output pulses to arrive at said selector means, said selector means producing first recurrent switching pulses coincident with each of said selected first pulses of said first recurrent output pulses, said selector means being further activated by each of said fourth recurrent center of scan pulses to select the first pulse of said second recurrent output pulses to arrive at said selector means, said selector means producing second recurrent switching pulses coincident with each of said selected first pulses of said second recurrent output pulses, switching means coupled to the output of said selector means and said sawtooth generator means, said switching means being responsive to said sawtooth voltage during said first switching pulses for producing a first direct output voltage varying according to the peak value of said sawtooth voltage during the scanning of said first pair of lines, said switching means being further responsive to said sawtooth voltage during said second switching pulses for producing a second direct output voltage varying according to the peak value of said sawtooth voltage during the scanning of said second pair of lines, comparator means coupled to the output of said switching means and responsive to the difference between said first and second direct output voltages for producing an error control voltage, and servo means coupled to said photoscanner and responsive to said error control voltage for automatically orienting said photoscanner about an axis perpendicular to its direction of scan for varying the direction of scan of said photoscanner until the first and second direct output voltages are substantially equal.

2. In a photo-responsive system for transversely scanning first and second pairs of lines on a chart, said first pair of lines intersecting said second pair of lines, said system including a photoscanner producing first recurrent output pulses corresponding to the first pair of lines being scanned and producing second recurrent output pulses corresponding to the second pair of lines being scanned wherein the time interval between said first recurrent output pulses varies according to the distance between said first pair of lines as measured along the line of scan of said photoscanner and wherein the time between said second recurrent output pulses varies according to the distance between said second pair of lines as measured along the line of scan, means for automatically controlling the direction of scan of said photoscanner with respect to said first and second pairs of lines, comprising in combination, sawtooth generator means coupled to the output of said photoscanner and responsive to said first and second recurrent output pulses for producing a sawtooth output voltage, said sawtooth output voltage having a first peak value varying according to the distance between said first pair of lines on said chart as measured along the line of scan and having a second peak value varying according to the distance between said second pair of lines on said chart as measured along the line of scan, means coupled to the output of said sawtooth generator means for producing a first output voltage whose magnitude varies according to the first peak value of said sawtooth voltage and producing a second output voltage whose magnitude varies according to the second peak value of said sawtooth voltage, comparator means coupled to the output of said means producing said first and second output voltages and responsive to the difference between said first and second output voltages for producing an error control output voltage, and servo means responsive to said error control voltage for rotating said photoscanner about an axis perpendicular to its direction of scan for varying the direction of scan of said photoscanner, the direction of scan of said photoscanner being automatically aligned to scan substantially parallel to a diagonal defined by the intersection of said first pair of lines with said second pair of lines.

3. Apparatus for automatically controlling the direction of scan of a scanner with respect to first and second pairs of lines on a chart, said first pair of lines intersecting said second pair of lines, said scanner transversely scanning said first and second pairs of lines and producing first recurrent output pulses corresponding to the first pair of lines being scanned and producing second recurrent output pulses corresponding to the second pair of lines being scanned, the time between said first recurrent output pulses varying according to the distance between said first pair of lines as measured along the line of scan, the time between said second recurrent output pulses varying according to the distance between said second pair of lines as measured along the line of scan, comprising in combination, means coupled to the output of said scanner and responsive to said first recurrent output pulses for producing a first output voltage whose magnitude varies according to the time between said first recurrent output pulses, said means being further responsive to said second recurrent output pulses for producing a second output voltage whose magnitude varies according to the time between said second recurrent pulses, comparator means coupled to the output of said first and second voltage producing means for producing an error control output voltage whose magnitude varies according to the difference between said first and second voltages, and servo means coupled to said scanner and responsive to said error control output voltage for controlling the direction of scan of said scanner to scan substantially parallel to a selected diagonal defined by the intersection of said first pair of lines with said second pair of lines.

4. Apparatus for automatically controlling the direction of scan of a scanner with respect to first and second pairs of lines on a chart, said scanner transversely scanning said first and second pairs of lines and producing first recurrent output pulses corresponding to the first pair of lines being scanned and producing second recurrent output pulses corresponding to the second pair of lines being scanned, comprising in combination, means coupled to the output of said scanner and responsive to said first and second recurrent output pulses for producing a first output voltage whose magnitude varies according to the distance between said first pair of lines as measured along the line of scan, said means further producing a second output voltage whose magnitude varies according to the distance between said second pair of lines as measured along the line of scan, means coupled to the output of said first and second voltage producing means and responsive to the difference between said first and second voltages for producing an output error control voltage, and servo means coupled to said scanner and responsive to said output error control voltage for automatically controlling the direction of scan of said scanner until said first and second output voltages are substantially equal in value.

5. The apparatus as defined in claim 4 further comprising indicator means cooperating with said scanner for indicating the direction of scan of said scanner relative to said chart.

6. Apparatus for automatically controlling the direction of scan of a scanner system with respect to first and second pairs of lines on a chart, comprising in combination, a scanner for transversely scanning said first and second pairs of lines, said scanner producing a first output voltage whose magnitude varies according to the distance between said first pair of lines as measured along the line of scan, said scanner means further producing a second output voltage whose magnitude varies according to the distance between said second pair of lines as measured along the line of scan, and means coupled to the output of said scanner means and responsive to the difference between said first and second voltages for rotating the direction of scan of said scanner means relative to said first and second pairs of lines on said chart until said first voltage is substantially equal to said second voltage.

7. Apparatus for automatically controlling the direction of scan of a scanner system with respect to first and second pairs of lines on a chart, comprising in combination, scanner means for transversely scanning said first and second pairs of lines, said scanner means producing first recurrent output pulses corresponding to the first pair of lines being scanned and producing second recurrent output pulses corresponding to the second pair of lines being scanned, the time between said first recurrent output pulses varying according to the distance between said first pair of lines as measured along the line of scan, the time between said second recurrent output pulses varying according to the distance between said second pair of lines as measured along the line of scan, means coupled to the output of said scanner means and responsive to said first and second recurrent output pulses, said means producing an output control voltage varying according to the difference in distance between said first pair of lines and said second pair of lines as measured along the line of scan, and means responsive to said control voltage for rotating the direction of scan of said scanner means relative to said first and second pairs of lines until the distance between said first pair of lines as measured along the line of scan is substantially equal to the distance between said second pair of lines as measured along the line of scan.

8. In a scanning system for transversely scanning first and second pairs of lines on a chart, means for producing an output control voltage whose magnitude varies according to the difference in distance between said first pair of lines as measured along the line of scan and said second pair of lines as measured along the line of scan, comprising in combination, scanner means producing first recurrent output pulses corresponding to the first pair of lines being transversely scanned and producing second recurrent output pulses corresponding to the second pair of lines being transversely scanned, the time between said first recurrent output pulses varying according to the distance between said first pair of lines as measured along the line of scan, the time between said second recurrent output pulses varying according to the distance between said second pair of lines as measured along the line of scan, means coupled to the output of said scanner means and responsive to the first recurrent output pulses for producing a first direct output voltage whose magnitude varies according to the time between said first recurrent output pulses, said means being further responsive to said second recurrent output pulses for producing a second direct output voltage whose magnitude varies according to the time between said second recurrent pulses, and comparator means coupled to the output of said direct voltage producing means and responsive to the difference between said first and second direct output voltages for producing said direct output control voltage.

9. Apparatus for automatically orienting the direction of scan of a scanner means relative to first and second pairs of lines on a chart, said first pair of lines intersecting said second pair of lines, said scanner means transversely scanning said first and second pairs of lines and producing first recurrent output pulses corresponding to said first pair of lines being scanned and producing second recurrent output pulses corresponding to said second pair of lines being scanned, comprising in combination, means coupled to the output of said scanner and responsive to said first recurrent output pulses for producing a first output voltage whose magnitude varies according to the distance between said first pair of lines as measured along the line of scan, said means being further responsive to said second recurrent output pulses for producing a second output voltage whose magnitude varies according to the distance between said second pair of lines as measured along the line of scan, means coupled to the output of said voltage producing means and responsive to the difference between said first and second voltages for producing an output error control voltage, and servo means responsive to said output error control voltage for orienting the direction of scan of said scanner relative to said first and second pairs of lines on said chart, the direction of scan being oriented to scan along a line substantially parallel to a diagonal defined by the intersection of said first pair of lines with said second pair of lines.

10. The apparatus as defined in claim 9 further comprising indicator means cooperating with said scanner means for indicating the direction of scan when said scanner means is oriented to scan substantially parallel to the short diagonal of said first and second pairs of lines.

11. In a photo-responsive system for transversely scanning first and second lines on a chart, said system including a photoscanner producing recurrent output pulses corresponding to the lines being scanned, the time interval between said recurrent output pulses varying according to the distance between said lines as measured along the line of scan, said photoscanner further producing recurrent center of scan pulses whose time position occurs at the center of scan of said photoscanner as said lines are being scanned, means for producing a direct output voltage varying according to the distance between said lines as measured along the line of scan, comprising in combination, delay pulse generator means coupled to the output of said photoscanner and responsive to said first mentioned recurrent output pulses, said delay pulse generator introducing a fixed time delay of said first recurrent pulses, said time delay being a very small percentage of the recurrence time interval of said first recurrent pulses, sawtooth generator means coupled to the output of said time delay pulse generator and responsive to said first recurrent pulses for producing a sawtooth output voltage, the peak value of said sawtooth voltage varying according to the distance between said lines as measured along the line of scan, selector means coupled to said photoscanner and responsive to said first recurrent pulses and to said recurrent center of scan pulses, said selector means being activated by said center of scan pulses for selecting the first pulse of said first recurrent output pulses to arrive at said selector means following each center of scan pulse, said selector means producing recurrent output switching pulses coincident with each of said selected first pulses, and switching means coupled to the output of said selector means and said sawtooth generator means, said switching means being responsive to the coincidence of said recurrent switching pulses and said sawtooth voltage for producing said direct output voltage varying according to the peak value of said sawtooth voltage.

12. Apparatus for automatically controlling the direction of scan of a scanner system with respect to first and second pairs of lines on a chart, comprising in combination, scanner means for transversely scanning said first and second pairs of lines, said scanner means producing first recurrent output pulses whose recurrence interval corresponds to the distance between said first pair of lines as measured along the line of scan and producing second recurrent output pulses whose recurrence interval corresponds to the distance between said second pair of lines as measured along the line of scan, means coupled to the output of said scanner means and responsive to said first and second recurrent output pulses for producing an output control voltage varying according to the difference in distance between said first pair of lines and said second pair of lines as measured along the line of scan, and means responsive to said control voltage for varying the direction of scan of said scanner means relative to said first and second pairs of lines.

13. Scanning apparatus for comparing the distance between a first pair of fixed points with the distance between a second pair of fixed points, comprising in combination, scanner means for scanning separately said first and second pairs of fixed points and producing first recurrent output pulses whose recurrence interval corresponds to the distance between said first pair of points and producing second recurrent output pulses whose recurrence interval corresponds to the distance between said second pair of points, and means coupled to the output of said scanner means and responsive to said first and second recurrent pulses, said means producing an output voltage whose magnitude is determined according to the difference in the distance between said first pair of points and the distance between said second pair of points and whose sense is determined according to the larger of said distances.

14. In a scanning system for recurrently scanning a plurality of lines on a chart and producing a plurality of output pulses corresponding to the lines being scanned, said scanning system further producing recurrent output pulses corresponding to the center of scan of said scanning system, means for measuring the distance along the line of scan between the pair of lines on said chart between which the center of scan position of said scanning system is located, comprising in combination, means coupled to said scanning system and responsive to said plurality of pulses for producing a sawtooth output voltage, and means coupled to the output of said sawtooth producing means and to said scanning system and responsive to said recurrent center of scan pulses for selecting the peak value of said sawtooth voltage which occurs immediately following said center of scan pulse, the selected peak value of said sawtooth voltage varying according to the distance between the pair of lines being scanned within which the center of scan position of said scanning system is located.

No references cited.